(12) United States Patent
Koike et al.

(10) Patent No.: US 6,373,221 B2
(45) Date of Patent: Apr. 16, 2002

(54) CHARGER COUPLING

(75) Inventors: Yasuhiro Koike, Kariya (JP); Karl David Conroy, Huntington Beach; Phung T. Nguyen, Mission Viejo, both of CA (US)

(73) Assignees: Kabushiki Kaisha Toyoda Jidoshokki Seisakusho, Kariya (JP); General Motors Corporation, Detroit, MI (US)

( * ) Notice: Subject to any disclaimer, the term of this patent is extended or adjusted under 35 U.S.C. 154(b) by 0 days.

(21) Appl. No.: 09/748,898

(22) Filed: Dec. 27, 2000

(30) Foreign Application Priority Data

Dec. 27, 1999 (JP) .......................................... 11-369692

(51) Int. Cl.⁷ .............................................. H01M 10/46
(52) U.S. Cl. ...................................................... 320/108
(58) Field of Search ................................. 320/107, 108, 320/109; 336/DIG. 2

(56) References Cited

U.S. PATENT DOCUMENTS

| 5,684,380 A | * 11/1997 | Woody et al. | .............. 320/108 |
| 5,703,462 A | * 12/1997 | Woody et al. | .............. 320/108 |
| 5,714,864 A | * 2/1998 | Rose et al. | ................. 320/109 |

* cited by examiner

*Primary Examiner*—Edward H. Tso
(74) *Attorney, Agent, or Firm*—Morgan & Finnegan, LLP (57) ABSTRACT

A charger coupling for charging a battery includes a paddle and a receptacle. The paddle and the receptacle exchange information by radio waves. The paddle includes waveguides for guiding radio waves between an antenna of the paddle and an antenna or the receptacle. The waveguides improve the radio communication between the paddle and the receptacle.

10 Claims, 7 Drawing Sheets

CHARGER COUPLING

BACKGROUND OF THE INVENTION

The present invention relates to an inductive charger coupling. The coupling includes a receptacle and supplies electricity from an electric power source to the receptacle through the paddle. More particularly, the present invention pertains to a wireless communication device in the coupling.

Figure 10:
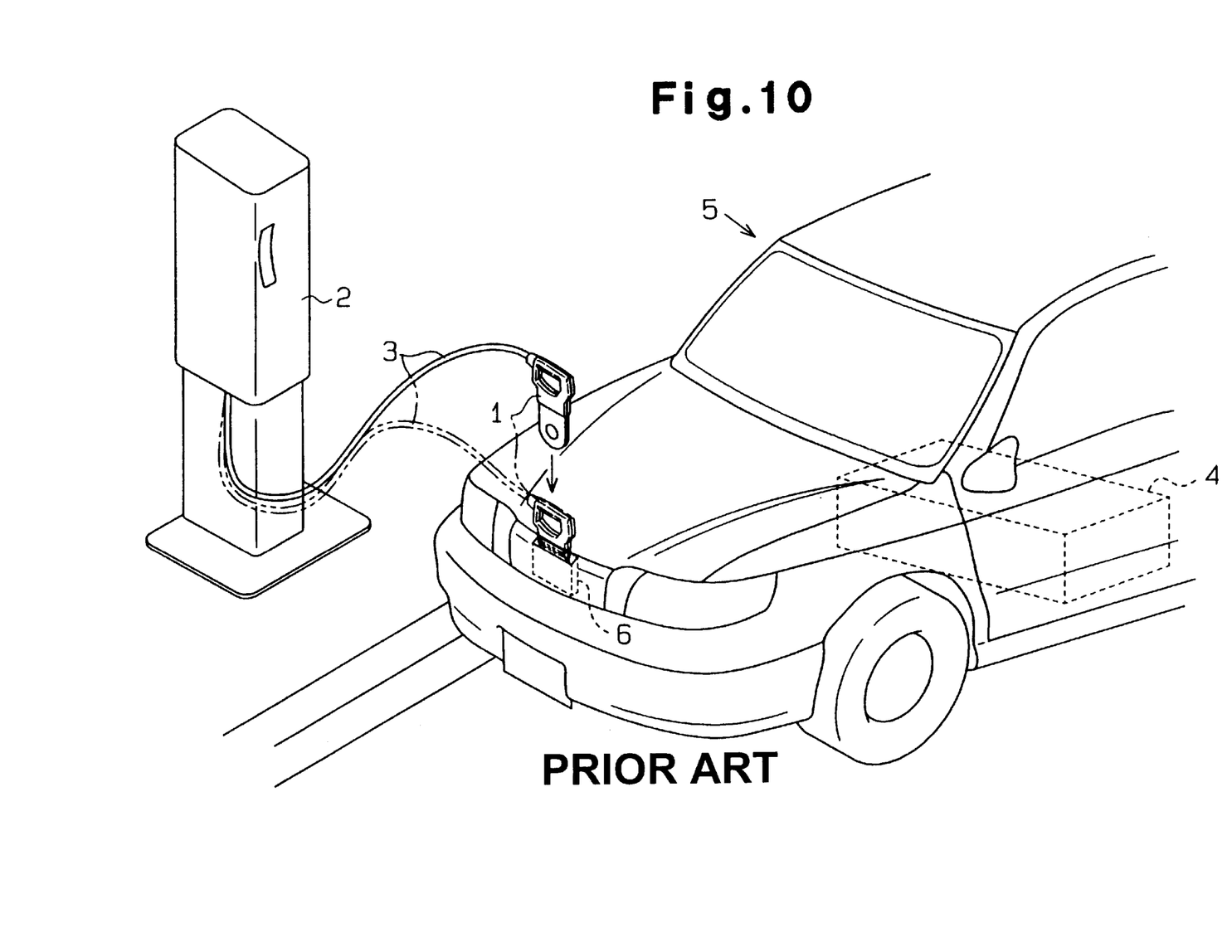
FIG. 10 is a perspective view illustrating a prior art charger coupling for an electric vehicle.

FIG. 10 illustrates an inductive charger coupling, which includes a charging paddle 1 and a receptacle 6. The paddle 1 is attached to the distal end of a cable 3, which is connected to an electricity supply apparatus 2. The receptacle 6 is located in an electric vehicle 5, which has a battery 4. As shown by dotted line in FIG. 10, the paddle 1 is plugged into the receptacle 6. The battery 4 is charged by electromagnetic induction between a coil in the paddle 1 and a coil in the receptacle 6.

Such a charger coupling performs a plurality of procedures such as interlocking and monitoring. Interlocking refers to a procedure for confirming a proper coupling between the paddle 1 and the receptacle 6 before starting charging. Monitoring refers to, for example, a procedure for monitoring the charging state of the battery 4 during charging. The charger coupling also determines the charging speed based on the voltage of the battery 4, which is detected by a detector in the vehicle 5.

Signals related to the above procedures are exchanged between the paddle 1 and the receptacle 6 by wireless communication. The receptacle 6 includes an antenna (not shown) and the paddle 1 has an antenna (not shown) that communicates with to the antenna of the receptacle 6.

To guarantee reliable communication between the paddle 1 and the receptacle 6, the length of the paddle antenna is preferably half of the wavelength of the radio waves being used. However, if the size of the paddle 1 is reduced, it is difficult to maintain the length of the antenna at the half of the wavelength.

SUMMARY OF THE INVENTION

Accordingly, it is an objective of the present invention to provide a charger coupling that includes a charging paddle and a receptacle and improves the communication.

To achieve the foregoing and other objectives and in accordance with the purpose of the present invention, a charger coupling for charging a battery is provided. The coupling includes a charging device, a receptacle and a waveguide member. The charging device includes a first core, a primary coil wound about the first core, and a first communication device having a first antenna. The receptacle receives the charging device. The receptacle includes a second core, a secondary coil wound about the second core, and a second communication device having a second antenna. When the receptacle receives the charging device, the second core and the first core form a magnetic circuit and the secondary coil induces a current in response to a current supplied to the primary coil. The second antenna exchanges radio waves with the first antenna. The waveguide member guides radio waves between the first antenna and the second antenna.

The present invention is also embodied in another charger coupling for charging a battery. The coupling includes a charging device, a receptacle and a waveguide member. The charging device includes a first core, a primary coil wound about the first core, a first communication circuit, a first antenna connected to the first communication circuit and a first case for accommodating the first core, the primary coil, the first communication circuit and the first antenna. The receptacle receives the charging device. The receptacle includes a second core, a secondary coil wound about the second core, a second communication circuit, a second antenna connected to the second communication circuit and a second case for accommodating the second core, the secondary coil, the second communication circuit and the second antenna. The second antenna faces the first antenna. When the receptacle receives the charging device, the second core and the first core form a magnetic circuit, the secondary coil induces a current in response to a current supplied to the primary coil. The waveguide member is a conductive member that forms a waveguide in the first case between the first antenna and the second antenna such that the waveguide guides radio waves transmitted between the first and second antennas.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(a) is an enlarged cross-sectional view of a part of FIG. 1;

FIG. 1(b) is a diagrammatic side view illustrating an electricity supply apparatus;

DETAILED DESCRIPTION OF THE PREFERRED EMBODIMENTS

A first embodiment of the present invention will be described with reference to FIGS. 1 to 6.

Figure 1:
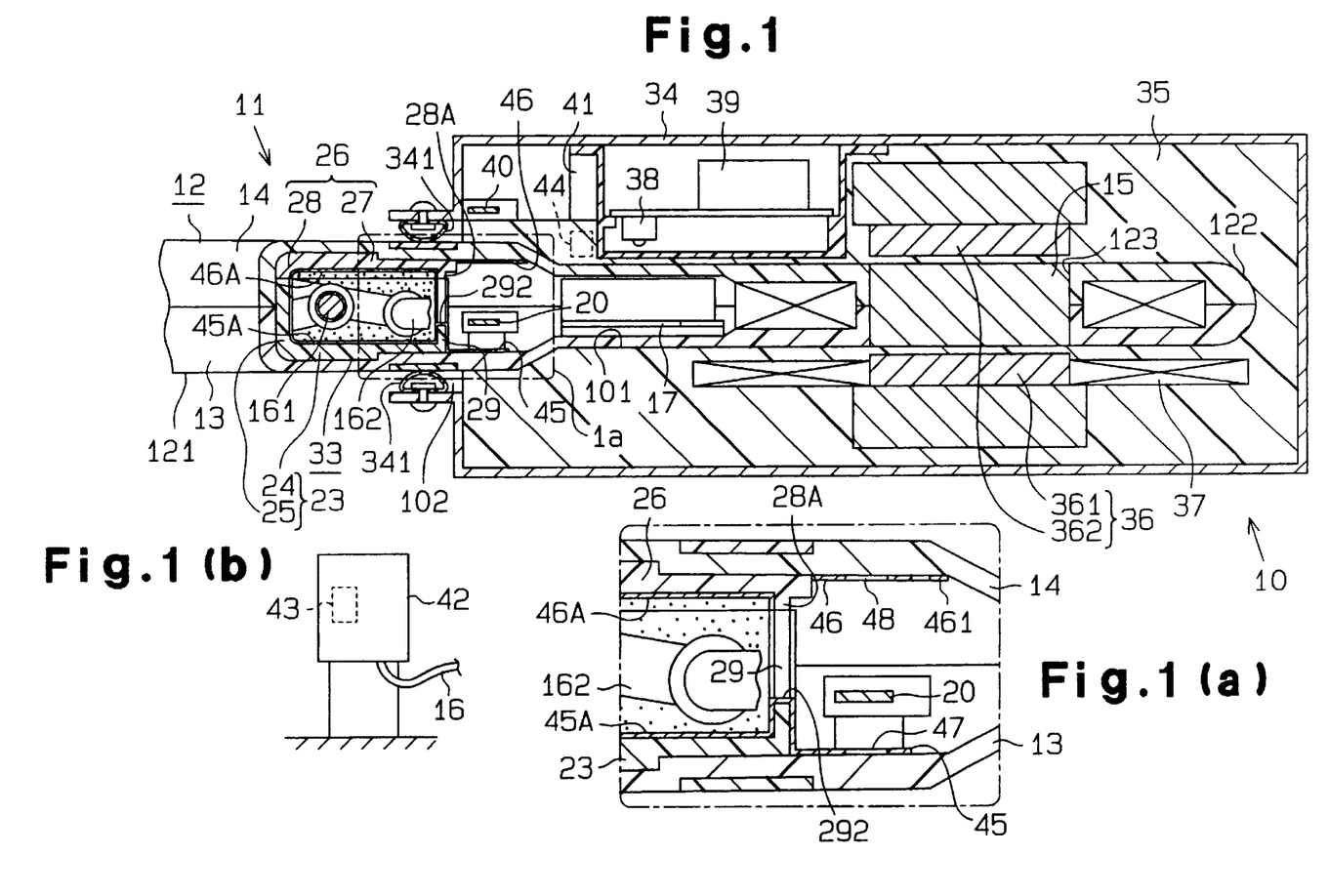
FIG. 1 is a cross-sectional view illustrating an inductive charger coupling according to a first embodiment of the present invention.
Figure 2:
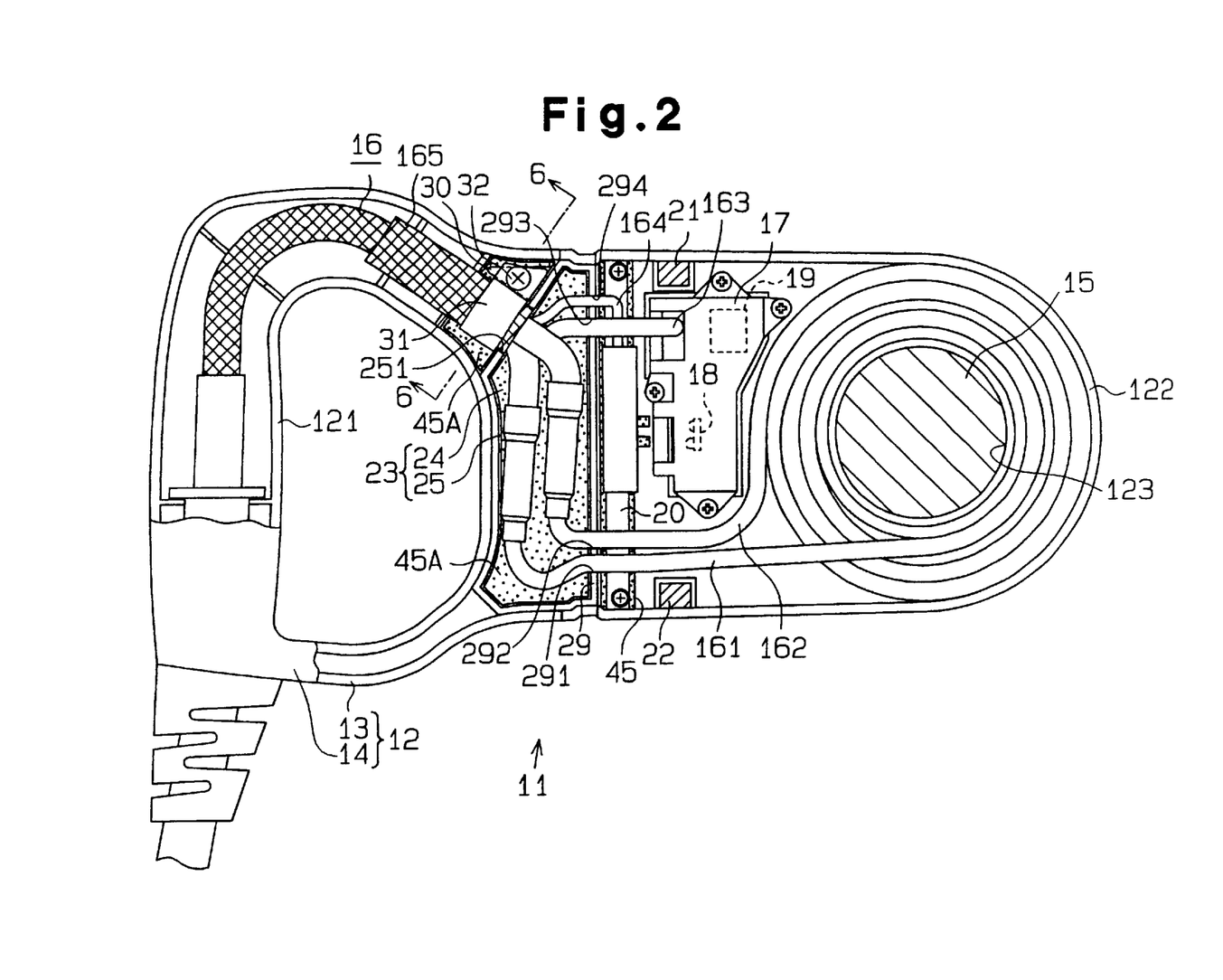
FIG. 2 is a cross-sectional view illustrating one of the case members of the charging paddle shown in FIG. 1.
Figure 4:
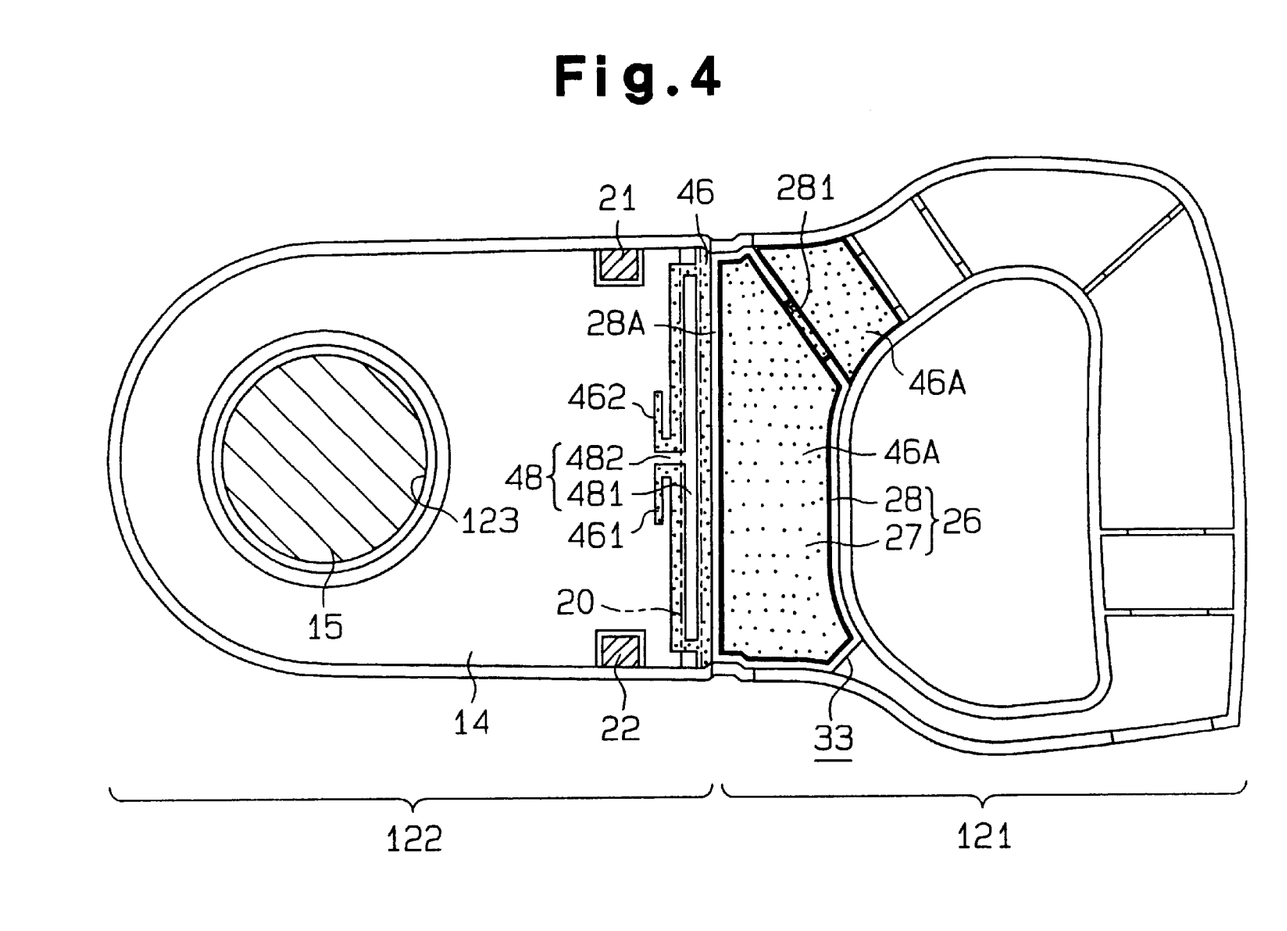
FIG. 4 is a cross-sectional view illustrating the other case member of the charging paddle shown in FIG. 1.

FIG. 1 illustrates a charger coupling according to the first embodiment. The coupling includes a receptacle 10 and a paddle 11. In FIG. 1, the paddle 11 is plugged into the receptacle 10. A reception coil 37 of the receptacle 10 is electrically connected to a vehicle battery (not shown). The paddle 11 includes a case 12. The case 12 is formed by first and second resin case members 13, 14, which are welded to each other. As shown in FIGS. 2 and 4, the case 12 includes a grip 121 and a plug portion 122. A ferrite core 15 is fitted in a hole 123 of the plug portion 122. The paddle 11 is connected to a shielded charging cable 16. The cable 16 extends from a power source, which is also referred to as an electricity supply apparatus 42 (see FIG. 1(a)). Part of the cable 16 is located in the grip 121. Power lines 161, 162 in the cable 16 extend through the grip 121 and are wound about the ferrite core 15, which is located in the plug portion 122.

As shown FIG. 2, a substrate 17 and a dipole antenna 20 are located on the inner surface of the first case member 13 in the plug portion 122. The longitudinal center of the antenna 20 is electrically connected to a signal line 164, which is used for radio communication. An infrared sensor 18 and a communication circuit 19 are mounted on the substrate 17. The communication circuit 19 activates the infrared sensor 18. The substrate 17, the infrared sensor 18 and the communication circuit 19 form an infrared transmitter-receiver. The communication circuit 19 is connected to a signal line 163, which is used for infrared communication. The signal lines 163, 164, are included in the cable 16. As shown in FIGS. 2 and 4, magnets 21, 22 are located in the plug portion 122. The magnets 21, 22 are used for detecting that the paddle 11 is inserted into the receptacle 10.

As shown in FIG. 2, the first case member 13 includes a first conductive resin inner cover 23. The first inner cover 23 is integrated with the other parts of the first case member 13 by insert molding. The first inner cover 23 includes a first panel 24 and a first frame 25. The first frame 25 is perpendicular to the first panel 24. A notch 251 for receiving the cable 16 is formed in the first frame 25. The first panel 24 forms part of the first case member 13 and is exposed externally.

Figure 5:
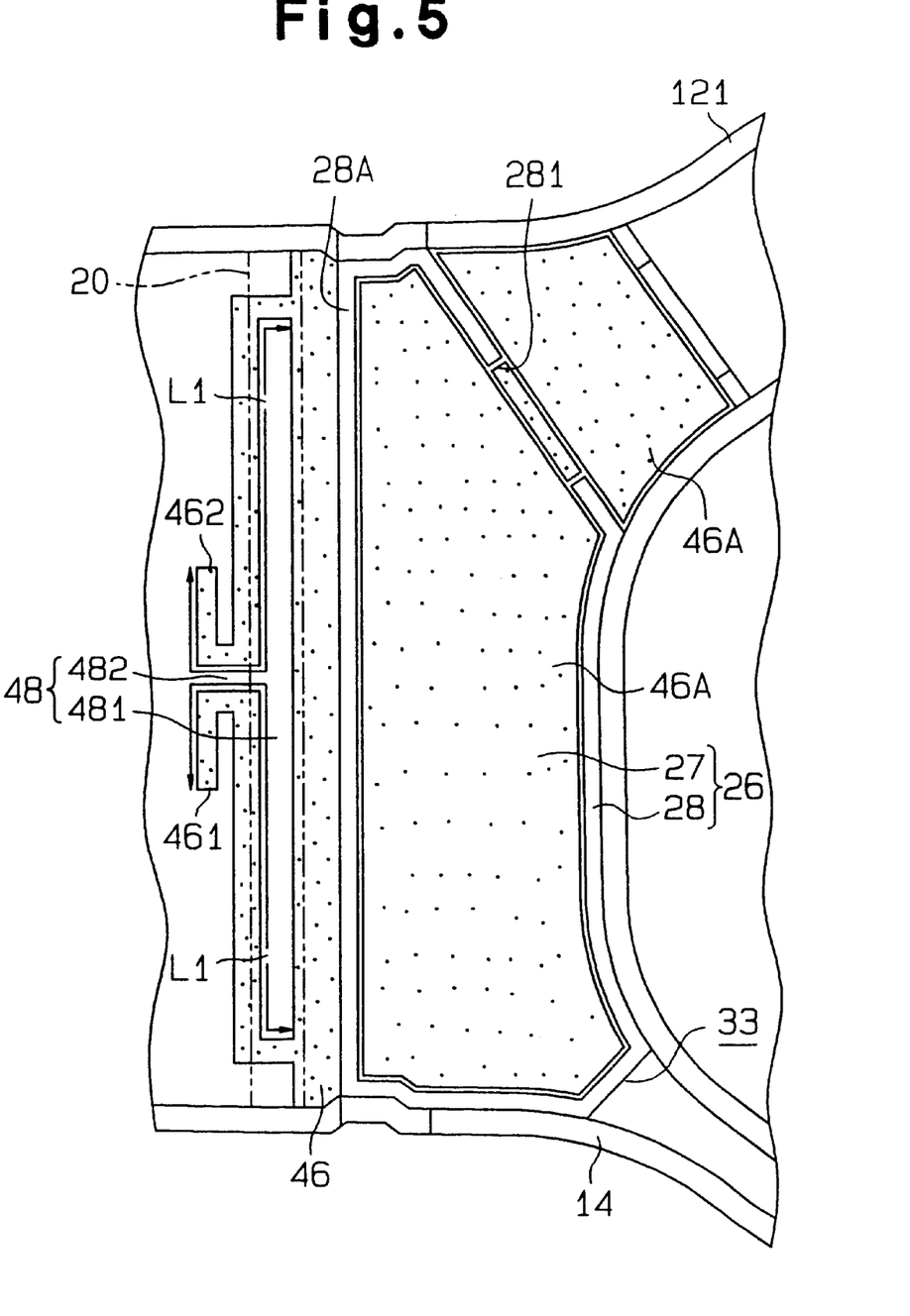
FIG. 5 is a partial enlarged cross-sectional view illustrating the case member shown in FIG. 4.

As shown in FIGS. 4 and 5, the second case member 14 includes a second conductive resin inner cover 26. The second inner cover 26 is integrated with the other parts of the second case member 14 by insert molding. The second inner cover 26 includes a second panel 27 and a second frame 28. The second frame 28 is perpendicular to the second panel 27. A notch 281 for receiving the cable 16 is formed in the second frame 28. The panel 27 forms part of the second case member 14 and is exposed externally. The shape and the size of the first frame 25 are substantially the same as those of the second frame 28. The frames 25, 28 are aligned when the case members 13, 14 are mated. The edge of the first frame 25 and the edge of the second frame 28 are welded to each other. The inner covers 23, 26 form a container 33.

Figure 3:
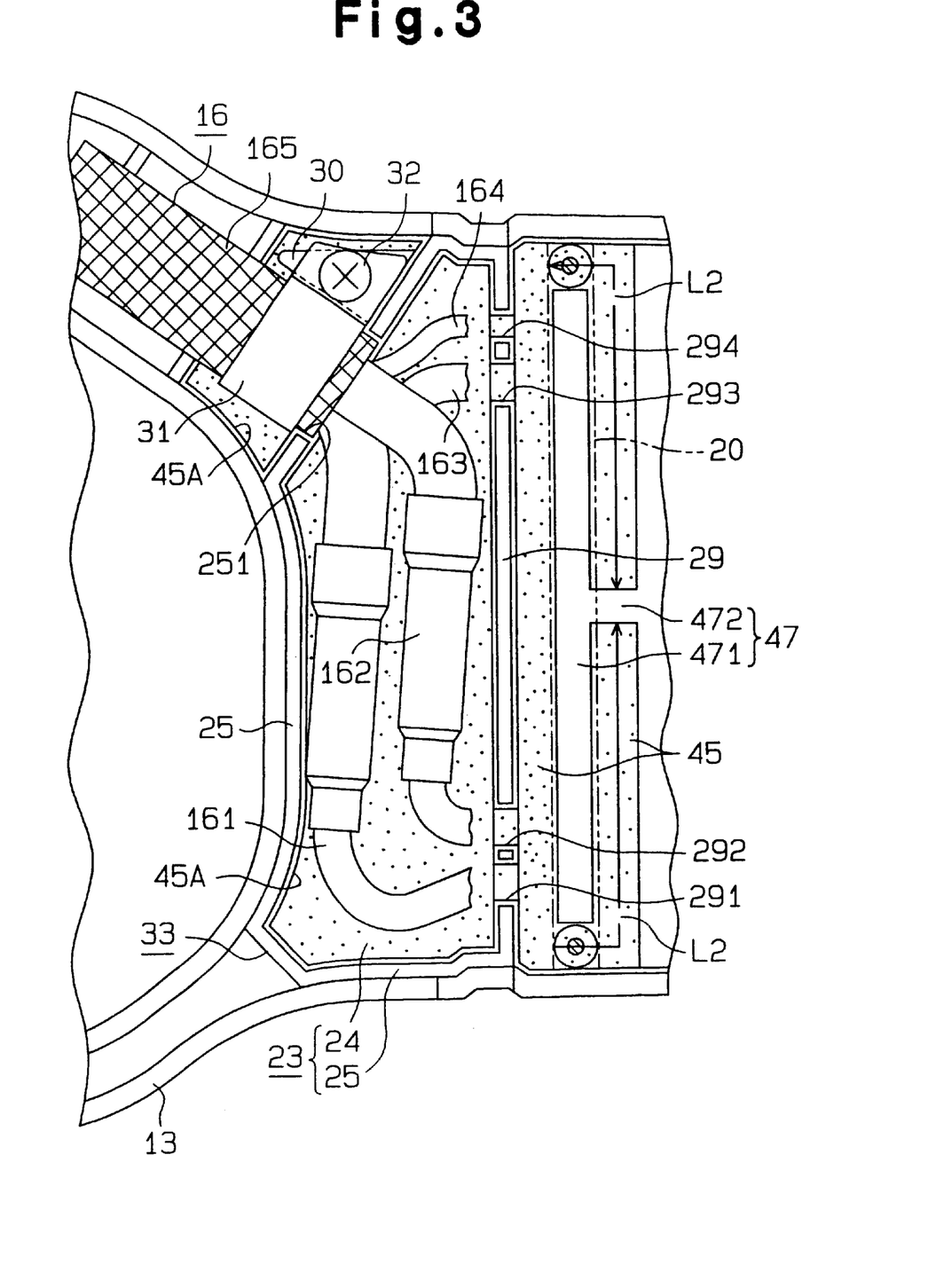
FIG. 3 is a partial enlarged cross-sectional view illustrating the case member shown in FIG. 2.
Figure 6:
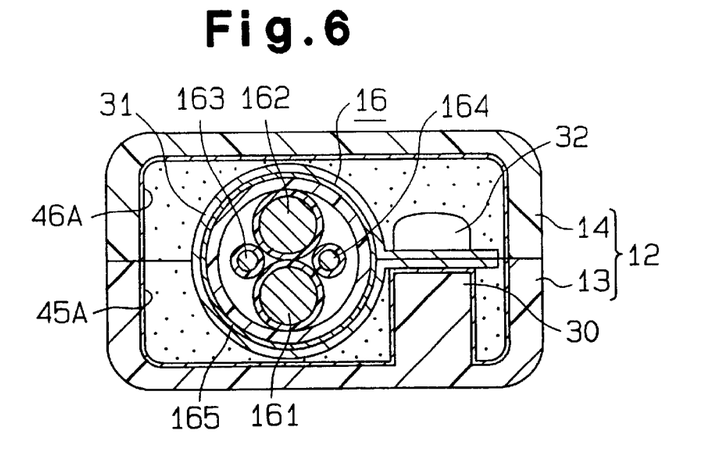
FIG. 6 is a cross-sectional view taken along line 6—6 of FIG. 2.

As shown in FIG. 3, a clamp seat 30 is integrally formed with the first inner cover 23. A conductive metal clamp 31 is attached to the clamp seat 30 by a screw 32. The clamp 31 holds the cable 16 and determines the position of the cable 16 in the grip 121. The cable 16 enters the container 33 through the opening defined by the notches 251, 281, which are formed in the frames 25, 28. As shown in FIGS. 3 and 6, the clamp 31 is electrically connected to a conductive shield layer 165, which surrounds the cable 16. The shield layer 165 is connected to a grounding terminal (not shown) of the electricity supply apparatus 42, which is shown in FIG. 1(b).

As shown in FIG. 3, the power lines 161, 162 and the signal lines 163, 164, which are included in the cable 16, are separate in the container 33. Notches 291, 292, 293, 294 are formed in a wall 29 of the first frame 25. The notches 291 to 294 determine the positions of the lines 161 to 164. Specifically, the power lines 161, 162 are received by the notches 291, 292, respectively. The signal lines 163, 164 are received by the notches 293, 294, respectively. As shown in FIG. 2, the signal line 164 is connected to the antenna 20.

As shown in FIG. 1, the receptacle 10 includes an aluminum case 34. A resin inner support 35 is located in the case 34. The inner support 35 holds a ferrite core unit 36. The core unit 36 includes a pair of cores 361, 362. The reception coil 37 is wound about the core 361. FIG. 1 illustrates a charging state in which the paddle 11 is completely inserted into a cavity 101 of the receptacle 10 through an opening 102. In the charging state, the ferrite core 15 of the paddle 11 is aligned with the cores 361, 362. When electricity is supplied to the power lines 161, 162, the vehicle battery is charged. The wall 29 and a wall 28A of the second frame 28 are located near the opening 102, and the conductive resin covers 23, 26 substantially close the opening 102. The antenna 20 is parallel to the walls 29 and 28A and extends in the lateral direction of the paddle 11.

A plurality of conductive metal terminals 341 are located in the wall of the opening 102. In the state of FIG. 1, the terminals 341 elastically contact the externally exposed portions of the inner covers 23, 26. The case 34 is electrically connected to a vehicle grounding terminal (not shown).

In the state of FIG. 1, some of the noise radiated from the power lines 161, 162 and the reception coil 37 in the receptacle 10 is absorbed by the aluminum case 34. The radiation noise is then converted into a noise current that flows to the vehicle grounding terminal. Radiation noise that passes through the opening 102 from the receptacle 10 is absorbed by the container 33, which substantially blocks the opening 102. The noise is then converted into noise current that flows to the terminals 341 and the clamp 31. The noise current flows from the clamp 31 to the grounding terminal of the electricity supply apparatus 42, which is shown in FIG. 1(b), through the shield layer 165. The container 33 prevents noise radiated from the paddle 11 and the receptacle 10 during charging from escaping.

As shown in FIGS. 2 and 3, conductive metal plating layers 45, 45A are formed on the inner surface of the case member 13 near the antenna 20, the outer surface of the wall 29, the surface of the notches 291, 292, 293, 294, the inner surface of the inner cover 23, the surface of the notch 251, the surface of the clamp seat 30 and the inner surface of the case member 13 near the clamp seat 30. The plating layers 45 and 45A are connected to each other at the notches 291, 292, 293, 294. As shown in FIGS. 4 and 5, conductive metal plating layers 46, 46A are formed on the inner surface of the second inner cover 26, the surface of the notch 281 and the inner surface of the case member 14 near the clamp seat 30. The plating layers 46 and 46A are electrically connected to each other by the second inner cover 26. The plating layers 45, 45A and 46, 46A are close to each other at the contacting edges of the case members 13, 14, that is, between the edge of the first frame 25 and the edge of the second frame 28. As shown in FIG. 6, the plating layer 45A is connected to the shield layer 165 by the clamp 31. As shown in FIG. 1, the antenna 20 is insulated from the plating layers 45, 45A, 46, 46A.

As shown in FIG. 3, the plating layer 45 defines a waveguide 47 on the inner surface of the case member 13. The waveguide 47 includes a main portion 471 and a center portion 472, which extends from the center of the main portion 471. As shown in FIG. 5, the plating layer 46 defines a waveguide 48 on the inner surface of the case member 14. The waveguide 48 includes a main portion 481 and a center portion 482, which extends from the center of the main portion 481.

The waveguide 47 faces the waveguide 48 with the antenna 20 in between. The clearance between the antenna 20 and the waveguide 47 is slightly less than the clearance between the antenna 20 and the waveguide 48. The antenna 20 contacts the signal line 164 between the center portions 472 and 482. In other words, the junction between the antenna 20 and the signal line 164 is located between the center portions 472 and 482. As shown in FIG. 5, the plating layer 46 includes adjusters 461, 462. The length L1 shown in FIG. 5 is approximately the quarter of the wavelength λ of the radio wave used by the antenna 20. The length L2 shown in FIG. 3 is shorter than the length L1. The antenna 20 is shorter than the half of the wavelength λ.

In this specification, the first case member 13 is defined to be located to the left of the antenna 20 and the second case member 14 is defined to be located to the right of the antenna 20. Therefore, the plating layers 45, 45A are located to the left of the antenna 20 and the plating layers 46, 46A are located to the right of the antenna 20.

As shown in FIG. 1, an infrared sensor 38 and a communication circuit 39 are located in the inner support 35 of the receptacle 10. The communication circuit 39 actuates the infrared sensor 38. The infrared sensor 38 and the communication circuit 39 form an infrared transmitter-receiver. Also, an antenna 40 and a communication circuit 41 are located in the inner support 35. The antenna 40 and the communication circuit 41 form a radio transmitter-receiver. A magnetic sensor 44 is also located in the support 35.

When the paddle 11 is completely inserted in the cavity 101 of the receptacle 10, the antenna 40 is aligned with the antenna 20, and the waveguide 48 is in between the two antennas 20, 40. The infrared sensor 38 of the receptacle 10 is aligned with the infrared sensor 18 of the paddle 11. Also, when the paddle 11 is oriented as illustrated in FIG. 1, the magnet 21 of the paddle 11 (see FIGS. 2 and 4) is aligned with the magnet sensor 44 of the receptacle 10. If the paddle 11 is completely inserted in the cavity 101 of the receptacle 10 in an orientation opposite to that of FIG. 1, the antenna 40 is aligned with the antenna 20, and the waveguide 47 is in between the two antennas 20, 40. Also, the infrared sensor 38 of the receptacle 10 is aligned with the infrared sensor 18 of the paddle 11. The magnet 22 of the paddle 11 (see FIGS. 2 and 4) is aligned with the magnet sensor 44 of the receptacle 10.

The infrared sensor 18, the infrared sensor 38 and the communication circuit 39 form an infrared communication system. The antenna 20, the antenna 40 and the communication circuit 41 form a radio communication system. The infrared communication system and the radio communication system are used selectively. A controller 43 of the electricity supply apparatus 42, which is shown in FIG. 1A, uses either the radio communication system or the infrared communication system while charging the vehicle battery. At this time, the controller 43 performs an interlock control procedure and monitors the charging state. In the interlock procedure, a proper coupling between the paddle 1 and the receptacle 6 is confirmed before charging is started. The magnet sensor 44 detects either the magnet 21 or the magnet 22 when the paddle 11 is completely inserted into the receptacle 10 and sends the detected information to the controller 43. The controller 43 also performs the monitoring procedure for monitoring the charging state of the battery during charging. Signals related to the interlocking and monitoring procedures are exchanged between the antenna 40 of the receptacle 10 and the antenna 20 of the paddle 11 or between the infrared sensor 38 of the receptacle 10 and the infrared sensor 18 of the paddle 11.

The illustrated embodiment has the following advantages.

When the paddle 11 is inserted into the cavity 101 of the receptacle 10, the waveguide 48 or 47 is located between the antennas 20 and 40. The plating layers 46 and 45, which define the waveguides 48 and 47, guide the radio waves between the antennas 20 and 40. The waveguides 48, 47 improve the characteristics of the antenna 20, which is shorter than the half of the wavelength λ, which improves the radio communication between the paddle 11 and the receptacle 10.

When the paddle 11 is completely inserted into the receptacle 10, the waveguide 48 or the waveguide 47 is located between and aligned with the antennas 20 and 40. This structure improves the radio communication performance between the paddle 11 and the receptacle 10.

The main portion 481 or 471 is located between the antennas 20 and 40. The center portion 482 or 472 corresponds to the junction between the antenna 20 and the signal line 164. This structure improves the characteristics of the antenna 20, which is a dipole antenna.

The plating layers 45, 45A are located to the left of the antenna 20 and the plating layers 46, 46A are located to the right of the antenna 20. The paddle 11 is inserted into the receptacle 10 in either orientation. That is, the paddle 11 can be in inserted into the receptacle 10 with the second case member 14 being above of the first case member 13, from the perspective of FIG. 1, or the first case member 13 can be above the second case member 14. In either case, one of the waveguides 48, 47 is located between the antenna 40 of the receptacle 10 and the antenna 20 of the paddle 11. Therefore, the structure of the illustrated embodiment improves the communication between the receptacle 10 and the paddle 11 regardless of the orientation of the paddle 11.

The waveguides 47, 48 are defined by the plating layers 45, 46, which simplifies the structure.

The plating layers 45, 46 are the most preferable structure for defining the waveguides 47, 48.

The plating layers 45, 46, which define the waveguides 47, 48, are preferably grounded to improve the performance of the waveguides 47, 48. The plating layer 45 is connected to the grounding terminal of the electricity supply apparatus 42 through the plating layer 45A, the clamp 31 and the shield layer 165. Also, the plating layer 46 is connected to the grounding terminal of the apparatus 42 through the plating layer 46A, the clamp 31 and the shield layer 165. Thus, the illustrated embodiment improves the performance of the waveguides 47, 48.

The clearance between the antenna 20 and the waveguide 47 is slightly less than the clearance between the antenna 20 and the waveguide 48. This is because the plating layer on the outer surface of the wall 29, which is substantially grounded, is close to the antenna 20.

The clearance between the antenna 20 and the waveguides 47, 48 are preferably as small as possible to improve the performance of the waveguides 47, 48. The clearance between the antenna 20 and the waveguide 48 is greater than the clearance between the antenna 20 and the waveguide 47. Therefore, the performance of the waveguide 48 is not as good as that of the waveguide 47. However, the loss of performance is compensated for by setting the length L1 of the adjusters 461, 462 to one quarter of the wavelength λ.

It should be apparent to those skilled in the art that the present invention may be embodied in many other specific forms without departing from the spirit or scope of the invention. Particularly, it should be understood that the invention may be embodied in the following forms.

Figure 7:
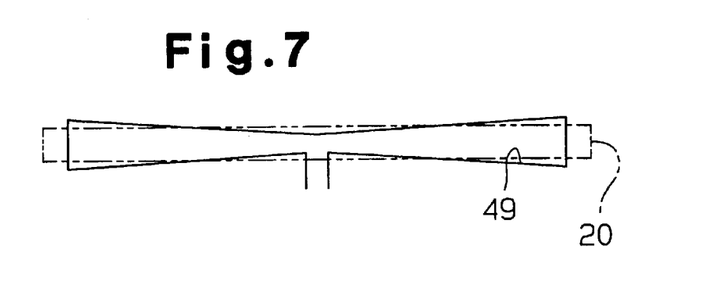
FIG. 7 is a plan view illustrating a waveguide according to a second embodiment.
Figure 8:
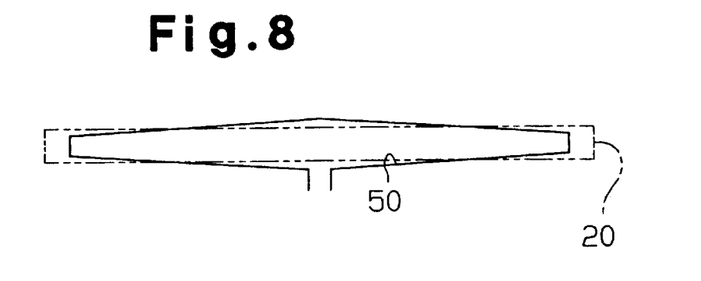
FIG. 8 is a plan view illustrating a waveguide according to a third embodiment.
Figure 9:
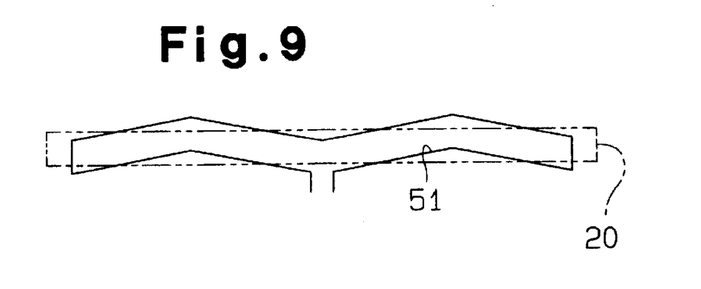
FIG. 9 is a plan view illustrating a waveguide according to a fourth embodiment.

The shape of the waveguide may be changed. For example, waveguides 49, 50, 51 having the shapes shown in FIGS. 7, 8 and 9 may be used.

The waveguide 48 on the second case member 14 may be replaced by a waveguide that has the same shape as the waveguide 47.

The waveguide 47 on the first case member 13 may be replaced by a waveguide that has the same shape as the waveguide 48.

A projection may be formed on the inner surface of each case member 13, 14 that faces the antenna 20 and a plating layer may be formed on each projection for defining a waveguide. The waveguides are relatively close to the antenna 20, which improves the performance of the antenna 20.

The waveguides 47, 48 may be defined by conductive metal plates.

A conductive plating layer or a conductive metal plate may be located between the antennas 20 and 40 and used as a waveguide.

The waveguides 47, 48 may be defined by conductive resin.

Therefore, the present examples and embodiments are to be considered as illustrative and not restrictive and the invention is not to be limited to the details given herein, but may be modified within the scope and equivalence of the appended claims.

What is claimed is:

1. A charger coupling for charging a battery, the coupling comprising:
   a charging device, wherein the charging device includes a first core, a primary coil wound about the first core, and a first communication device having a first antenna;
   a receptacle for receiving the charging device, wherein the receptacle includes a second core, a secondary coil wound about the second core, and a second communication device having a second antenna, wherein, when the receptacle receives the charging device, the second core and the first core form a magnetic circuit and the secondary core induces a current in response to a current supplied to the primary coil, and wherein the second antenna exchanges radio waves with the first antenna; and
   a waveguide member, wherein the waveguide member guides radio waves between the first antenna and the second antenna.

2. The charger coupling according to claim 1, wherein the waveguide member is a conductive member that forms a waveguide between the first antenna and the second antenna.

3. The charger coupling according to claim 1, wherein the waveguide member is a first waveguide member and the waveguide is a first waveguide, the charger coupling further comprising a second waveguide member, wherein the second waveguide member is a conductive member that has a second waveguide, and wherein the second waveguide member is located at the opposite side of the first antenna from the first waveguide member.

4. A charger coupling for charging a battery, the coupling comprising:
   a charging device, wherein the charging device includes a first core, a primary coil wound about the first core, a first communication circuit, a first antenna connected to the first communication circuit and a first case for accommodating the first core, the primary coil, the first communication circuit and the first antenna;
   a receptacle for receiving the charging device, wherein the receptacle includes a second core, a secondary coil wound about the second core, a second communication circuit, a second antenna connected to the second communication circuit and a second case for accommodating the second core, the secondary coil, the second communication circuit and the second antenna, wherein the second antenna faces the first antenna, and wherein, when the receptacle receives the charging device, the second core and the first core form a magnetic circuit, the secondary coil induces a current in response to a current supplied to the primary coil; and
   a waveguide member, wherein the waveguide member is a conductive member that forms a waveguide in the first case between the first antenna and the second antenna such that the waveguide guides radio waves transmitted between the first and second antennas.

5. The charger coupling according claim 4, wherein the first antenna is a dipole antenna, and wherein the waveguide includes a center portion and a main portion, and wherein the center portion corresponds to a junction between the first antenna and a signal line and the main portion corresponds to and extends along the first antenna.

6. The charger coupling according to claim 5, wherein the waveguide member comprises a conductive metal plating layer formed on the inner surface of the first case.

7. The charger coupling according to claim 5, wherein the waveguide member is a first waveguide member and the waveguide is a first waveguide, and the charger coupling further comprises a second waveguide member, wherein the second waveguide member is a conductive member that has a second waveguide, and wherein the second waveguide member is located at the opposite side of the first antenna from the first waveguide member.

8. The charger coupling according claim 7, wherein the center portion is a first center portion and the main portion is a first main portion, and wherein the second waveguide includes a second center portion and a second main portion, and wherein the second center portion corresponds to a junction between the first antenna and a signal line and the second main portion corresponds to and extends along the first antenna.

9. The charger coupling according to claim 8, wherein the second waveguide member comprises a conductive metal plating layer formed on the inner surface of the first case.

10. The charger coupling according to claim 8, wherein the length of the first antenna is less than a half of the wavelength of the used radio waves, and wherein the length of the first main portion is substantially equal to a quarter of the wavelength of the radio waves, and wherein the length of the second main portion is less than the length of the first main portion.

* * * * *